United States Patent
Iseki et al.

(10) Patent No.: US 10,727,498 B2
(45) Date of Patent: Jul. 28, 2020

(54) REDOX FLOW BATTERY ELECTRODE, AND REDOX FLOW BATTERY

(71) Applicant: SHOWA DENKO K.K., Tokyo (JP)

(72) Inventors: Keizo Iseki, Tokyo (JP); Masatoshi Ichikawa, Tokyo (JP); Gaku Oriji, Tokyo (JP); Kenzo Hanawa, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 80 days.

(21) Appl. No.: 15/538,308

(22) PCT Filed: Dec. 24, 2015

(86) PCT No.: PCT/JP2015/086043
§ 371 (c)(1),
(2) Date: Jun. 21, 2017

(87) PCT Pub. No.: WO2016/104613
PCT Pub. Date: Jun. 30, 2016

(65) Prior Publication Data
US 2018/0034066 A1    Feb. 1, 2018

(30) Foreign Application Priority Data
Dec. 26, 2014    (JP) ................ 2014-264704

(51) Int. Cl.
*H01M 4/96* (2006.01)
*H01M 4/86* (2006.01)
(Continued)

(52) U.S. Cl.
CPC ........... *H01M 4/96* (2013.01); *H01M 4/8652* (2013.01); *H01M 4/8657* (2013.01);
(Continued)

(58) Field of Classification Search
CPC .... H01M 4/96; H01M 8/0202; H01M 4/8657; H01M 8/188; H01M 4/8652; Y02E 60/528
(Continued)

(56) References Cited

U.S. PATENT DOCUMENTS

| 5,656,390 A | 8/1997 | Kageyama et al. |
| 2002/0045091 A1* | 4/2002 | Kamei ................ B32B 5/00 429/62 |

(Continued)

FOREIGN PATENT DOCUMENTS

| CN | 101651201 A | 2/2010 |
| EP | 2682517 A2 | 1/2014 |

(Continued)

OTHER PUBLICATIONS

Communication dated May 14, 2018, from the European Patent Office in counterpart European Application No. 15873181.0.
(Continued)

*Primary Examiner* — Jonathan G Jelsma
*Assistant Examiner* — Omar M Kekia
(74) *Attorney, Agent, or Firm* — Sughrue Mion, PLLC (57) ABSTRACT

A redox flow electrode according to one aspect of the present invention is a redox flow battery electrode disposed between an ion exchange membrane and a bipolar plate, wherein the electrode includes a conductive sheet containing carbon nanotubes having an average fiber diameter of 1 μm or less, and a porous sheet that is laminated to the conductive sheet and is formed from fibers having an average fiber diameter of greater than 1 μm.

10 Claims, 2 Drawing Sheets

(51) Int. Cl.
*H01M 8/0202* (2016.01)
*H01M 8/18* (2006.01)

(52) U.S. Cl.
CPC ......... *H01M 8/0202* (2013.01); *H01M 8/188* (2013.01); *Y02E 60/528* (2013.01)

(58) Field of Classification Search
USPC .......................................................... 429/72
See application file for complete search history.

(56) References Cited

U.S. PATENT DOCUMENTS

| | | | |
|---|---|---|---|
| 2008/0241695 A1 | 10/2008 | Song et al. | |
| 2009/0246592 A1 | 10/2009 | Kinoshita | |
| 2012/0301767 A1 | 11/2012 | Kim | |
| 2013/0037760 A1 | 2/2013 | Maeda et al. | |
| 2013/0095361 A1* | 4/2013 | Sinsabaugh | H01M 8/188 |
| | | | 429/101 |
| 2014/0045095 A1 | 2/2014 | Mitchell et al. | |
| 2014/0322614 A1* | 10/2014 | Eitouni | H01M 4/624 |
| | | | 429/309 |
| 2015/0147620 A1* | 5/2015 | Lee | H01M 8/0206 |
| | | | 429/105 |

FOREIGN PATENT DOCUMENTS

| | | |
|---|---|---|
| JP | 8-287938 A | 11/1996 |
| JP | 2006-156029 A | 6/2006 |
| JP | 2010-244972 A | 10/2010 |
| JP | 2011-228059 A | 11/2011 |
| JP | 2013-065530 A | 4/2013 |
| JP | 2013-144857 A | 7/2013 |
| JP | 2014-197476 A | 10/2014 |
| WO | 2009/116630 A1 | 9/2009 |
| WO | WO 2011-063298 * 5/2011 | ............... H05H 1/00 |

OTHER PUBLICATIONS

International Search Report for PCT/JP2015/086043, dated Mar. 8, 2016.

* cited by examiner

REDOX FLOW BATTERY ELECTRODE, AND REDOX FLOW BATTERY

CROSS REFERENCE TO RELATED APPLICATION

This Application is a National Stage of Application No. PCT/JP2015/086043 filed Dec. 24, 2015, claiming priority based on Japanese Patent Application No. 2014-264704 filed Dec. 26, 2014, the contents of all of which are incorporated herein by reference in their entirety.

TECHNICAL FIELD

The present invention relates to a redox flow battery electrode, and a redox flow battery having the electrode. Priority is claimed on Japanese Patent Application No. 2014-264704, filed Dec. 26, 2014, the content of which is incorporated herein by reference.

BACKGROUND ART

Redox flow batteries, which are known as large-capacity storage batteries, include redox flow batteries that use strongly acidic aqueous solutions typified by vanadium-based redox flow batteries.

Patent Document 1 discloses the use of a gas phase method carbon fiber for the electrode material of a redox flow battery. Patent Document 2 describes a carbon fiber felt having voids formed within the interior of the felt, which can be used as an electrode material that suffers little pressure loss when an electrolyte passes through the electrode, and exhibits good conductivity in the thickness direction. Further, Patent Document 3 discloses a redox flow battery having a structure in which a porous sheet material formed from a material that is softer than the material that constitutes the electrodes is provided between the ion exchange membrane and the electrodes.

PRIOR ART LITERATURE

Patent Documents

Patent Document 1: Japanese Unexamined Patent Application, First Publication No. 2006-156029
Patent Document 2: Japanese Unexamined Patent Application, First Publication No. 2013-144857
Patent Document 3: Japanese Unexamined Patent Application, First Publication No. 2013-65530

DISCLOSURE OF INVENTION

Problems to be Solved by the Invention

However, redox flow batteries based on the technologies described above still leave room for improvement in terms of performance such as electric capacity, cell resistivity and pressure loss.

Objects of the present invention are to provide a redox flow battery having a large electric capacity, low cell resistivity and little pressure loss when an electrolyte passes through the electrode, and to provide an electrode that can be used in the redox flow battery.

Means for Solving the Problems

As a result of intensive investigations aimed at achieving the above objects, the inventors of the present invention discovered that by using a redox flow battery electrode disposed between an ion exchange membrane and a bipolar plate, wherein the electrode is obtained by laminating a conductive sheet containing carbon nanotubes having an average fiber diameter of 1 μm or less and a porous sheet formed from fibers having an average fiber diameter of greater than 1 μm, a redox flow battery having excellent performance in terms of electric capacity, cell resistivity and pressure loss could be obtained. In other words, the present invention includes the aspects described below.

[1] A redox flow battery electrode having a conductive sheet containing carbon nanotubes with an average fiber diameter of 1 μm or less, and a porous sheet that is laminated to the conductive sheet and is formed from fibers with an average fiber diameter of greater than 1 μm.

[2] The redox flow battery electrode disclosed in [1], wherein the carbon nanotubes include first carbon nanotubes having an average fiber diameter of 100 to 1,000 nm, and second carbon nanotubes having an average fiber diameter of 30 nm or less.

[3] The redox flow battery electrode disclosed in [2], wherein the carbon nanotubes have a structure in which at least a portion of the second carbon nanotubes straddle two or more of the first carbon nanotubes.

[4] The redox flow battery electrode disclosed in [2] or [3], containing 0.05 to 30 parts by mass of the second carbon nanotubes per 100 parts by mass of the combined total of the first carbon nanotubes and the second carbon nanotubes.

[5] The redox flow battery electrode disclosed in any one of [1] to [4], wherein the conductive sheet contains carbon fibers having an average fiber diameter of greater than 1 μm, and contains not more than 95 parts by mass of the carbon fibers per 100 parts by mass of the combined total of the carbon nanotubes and the carbon fibers.

[6] The redox flow battery electrode disclosed in [5], wherein the conductive sheet contains a water-soluble conductive polymer, and contains not more than 5 parts by mass of the water-soluble conductive polymer per 100 parts by mass of the combined total of the carbon nanotubes and the carbon fibers.

[7] The redox flow battery electrode disclosed in any one of [1] to [6], wherein the porous sheet is formed from carbon fibers having an average fiber diameter of greater than 1 μm.

[8] The redox flow battery electrode disclosed in any one of [1] to [6], wherein the porous sheet is formed from polyphenylene sulfide fibers having an average fiber diameter of greater than 1 μm.

[9] A redox flow battery containing the redox flow battery electrode disclosed in any one of [1] to [8] disposed between an ion exchange membrane and a bipolar plate.

[10] The redox flow battery disclosed in [9], wherein comb-shaped grooves are formed on the surface of the bipolar plate facing the electrode.

Effects of the Invention

By using the redox flow battery electrode according to one aspect of the present invention, a redox flow battery can be obtained which has a large electric capacity, low cell resistivity, and little pressure loss when an electrolyte passes through the electrode.

BEST MODE FOR CARRYING OUT THE INVENTION

[Conductive Sheet]

The conductive sheet contains carbon nanotubes having an average fiber diameter of 1 µm or less. The average fiber diameter of the carbon nanotubes is preferably within a range from 1 to 300 nm, more preferably from 10 to 200 nm, and even more preferably from 15 to 150 nm.

The average fiber diameter is determined by using a transmission electron microscope to measure the diameter of at least 100 random fibers of each fiber type, and then calculating the arithmetic mean value of the measured values.

The carbon nanotubes contained in the conductive sheet may be composed of a mixture of a plurality of types of carbon nanotubes having different average fiber diameters. For example, the carbon nanotubes in the conductive sheet preferably include first carbon nanotubes having an average fiber diameter of 100 to 1,000 nm, and second carbon nanotubes having an average fiber diameter of 30 nm or less.

In the case where a plurality of types of carbon nanotubes having different average fiber diameters are mixed in the conductive sheet, when the formed conductive sheet is viewed under a transmission electron microscope, those fibers having a fiber diameter of 50 nm or greater are deemed to be the first carbon nanotubes, and those fibers in the same field of view having a fiber diameter of less than 50 nm are deemed to be the second carbon nanotubes. The average fiber diameters are then calculated for the first carbon nanotubes and the second carbon nanotubes in the manner described above.

A determination as to whether or not the carbon nanotubes contained in the conductive sheet are composed of a mixture of a plurality of types of carbon nanotubes having different average fiber diameters can be made in the manner described below. First, the formed conductive sheet is viewed under a transmission electron microscope, and the fiber diameter distribution is measured within a single field of view. Then, if two or more fiber diameter peaks exist in the distribution, the carbon nanotubes are deemed to be composed of a mixture of a plurality of types of carbon nanotubes having different average fiber diameters.

The average fiber diameter of the first carbon nanotubes is preferably within a range from 100 to 300 nm, more preferably from 100 to 200 nm, and even more preferably from 100 to 150 nm. The average fiber length of the first carbon nanotubes is preferably within a range from 0.1 to 30 µm, more preferably from 0.5 to 25 µm, and even more preferably from 0.5 to 20 µm.

The average fiber diameter of the second carbon nanotubes is preferably within a range from 1 to 30 nm, more preferably from 5 to 25 nm, and even more preferably from 5 to 20 nm. The average fiber length of the second carbon nanotubes is preferably within a range from 0.1 to 10 µm, more preferably from 0.2 to 8 µm, and even more preferably from 0.2 to 5 µm.

The average fiber length is determined by using a transmission electron microscope to measure the length of at least 100 random fibers of each fiber type, and then calculating the arithmetic mean value of the measured values.

It is preferable that at least a portion of the second carbon nanotubes straddle two or more of the first carbon nanotubes. In other words, the carbon nanotubes in the conductive sheet preferably have a structure in which at least a portion of the second carbon nanotubes straddle two or more of the first carbon nanotubes. This type of straddled structure can be confirmed, for example, by inspection using a transmission electron microscope. When structures in which at least a portion of the second carbon nanotubes intersect with two or more of the first carbon nanotubes, the conductive sheet can be deemed to "have straddled structures".

These "straddled structures" need not exist across all of the carbon nanotubes. For example, any conductive sheet in which some of the second carbon nanotubes can be confirmed as spanning first carbon nanotubes when an image of the electrode is captured at a magnification of 100,000× using a transmission electron microscope is deemed to have straddled structures. Of the second carbon nanotubes within the captured image, the proportion of the second carbon nanotubes having structures that span two or more of the first carbon nanotubes is preferably at least 10%, and is more preferably 50% or greater.

This proportion is calculated, for example, relative to a value of 100% for the total of all of the second carbon nanotubes visible in the image of the electrode captured by the transmission electron microscope at a magnification of 100,000λ. Those second carbon nanotubes for which one end extends outside of the image are not used in the calculation.

When the carbon nanotubes have the type of straddled structures described above, the conductive sheet is unlikely to break up during the molding process, and the shape of the sheet can be stably maintained. Further, with this structure, the gaps between the first carbon nanotubes that are mainly responsible for the conductivity can be filled with the second carbon nanotubes, meaning the conductivity of the electrode can be enhanced. By enhancing the conductivity of the electrode, the cell resistivity of the redox flow battery can be lowered and the electric capacity can be increased.

Provided the average fiber diameters of the first carbon nanotubes and the second carbon nanotubes are within the above ranges, the electrode adopts a structure that can maintain good strength and high conductivity. This is because the first carbon nanotubes function as trunks, and the second carbon nanotubes function as branch-like cross-linking structures which span across a plurality of the first carbon nanotubes. For example, provided the average diameter of the first carbon nanotubes is at least 100 nm, the trunks are stable, and the electrode structure is unlikely to suffer from cracking, making it easier to maintain satisfactory strength. On the other hand, provided the average diameter of the second carbon nanotubes is 30 nm or less, the second carbon nanotubes can be satisfactorily intertwined with the first carbon nanotubes, thereby improving the conductivity. In other words, by using an electrode having a conductive sheet containing two types of carbon nanotubes with these types of different average fiber diameters, the cell resistivity of the redox flow battery can be lowered and the electric capacity can be increased.

The carbon nanotubes in the conductive sheet more preferably adopt a structure in which at least a portion of the second carbon nanotubes are intertwined with two or more of the first carbon nanotubes. Intertwined structures can also be confirmed, for example, by inspection under a transmission electron microscope. When at least a portion of the second carbon nanotubes can be confirmed as having a structure that wraps at least once around the periphery of two or more of the first carbon nanotubes, the carbon nanotubes in the conductive sheet can be deemed to "have intertwined structures".

Intertwined structures can be expected to exhibit similar effects to straddled structures.

The second carbon nanotubes are preferably included in an amount of 0.05 to 30 parts by mass per 100 parts by mass of the combined total of the first carbon nanotubes and the second carbon nanotubes. The number of parts by mass of the second carbon nanotubes per 100 parts by mass of the combined total of the first carbon nanotubes and the second carbon nanotubes is more preferably from 0.1 to 20 parts by mass, and even more preferably from 1 to 15 parts by mass. Provided the amount of the second carbon nanotubes satisfies this range, the electrode adopts a structure that can maintain good strength and high conductivity. By ensuring that the amount of the second carbon nanotubes satisfies this range, the first carbon nanotubes are able to function as the main conductive component, whereas the second carbon nanotubes function as support structures that electrically link the first carbon nanotubes and efficiently support conductivity.

The amount of the second carbon nanotubes per 100 parts by mass of the combined total of the first carbon nanotubes and the second carbon nanotubes is determined by calculating the mass of the first carbon nanotubes and the second carbon nanotubes from the number and sizes of each type of nanotubes, with the assumption that all of the nanotubes have the same density. This calculation is performed for a single field of view when the formed conductive sheet is viewed under a transmission electron microscope. The first carbon nanotubes and the second carbon nanotubes can be identified using the method described above.

Provided the proportions of the first carbon nanotubes and the second carbon nanotubes satisfy the above range, the aforementioned "straddled structures" and "intertwined structures" are more easily formed. As mentioned above, this enables effects such as reduced cell resistivity and increased electric capacity to be obtained.

The conductive sheet may also include one or more other conductive materials besides the carbon nanotubes. Specific examples of these other materials include conductive polymers, graphite, and conductive carbon fibers. From the viewpoints of the acid resistance, oxidation resistance, and ease of mixing with the carbon nanotubes, the conductive sheet preferably also contains conductive carbon fibers. The volume resistivity of the carbon fibers is preferably not more than $10^7$ Ω·cm, and is more preferably $10^3$ Ω·cm or lower. The volume resistivity of the carbon fibers can be measured using the method prescribed in Japan Industrial Standard JIS R7609:2007.

The average fiber diameter of the carbon fibers contained in the conductive sheet is preferably greater than 1 μm. By using carbon fibers having a greater average fiber diameter than that of the carbon nanotubes, larger voids can be formed inside the conductive sheet, and the pressure loss when an electrolyte passes through the electrode can be reduced. Further, other effects such as improvements in the conductivity and strength of the sheet can also be expected. The structure formed between the carbon nanotubes and the carbon fibers is preferably a structure in which the carbon nanotubes are adhered to the surfaces of the carbon fibers, with the carbon nanotubes straddling a plurality of carbon fibers. With this type of structure, the pressure loss when an electrolyte passes through the electrode can be reduced while good conductivity is achieved. The average fiber diameter of the carbon fibers is preferably within a range from 2 to 100 μm, and more preferably from 5 to 30 μm. The average fiber length of the carbon fibers is preferably within a range from 0.01 to 20 mm, more preferably from 0.05 to 8 mm, and even more preferably from 0.1 to 1 mm.

The amount of carbon fiber contained in the conductive sheet is preferably not more than 95 parts by mass per 100 parts by mass of the combined total of the carbon nanotubes and the carbon fiber contained in the conductive sheet. By ensuring that the amount of carbon fiber contained in the conductive sheet satisfies this range, a redox flow battery electrode can be obtained that exhibits little pressure loss when an electrolyte passes through the electrode. The amount of carbon fiber contained in the conductive sheet per 100 parts by mass of the combined total of the carbon nanotubes and the carbon fiber contained in the conductive sheet is more preferably not more than 90 parts by mass, and even more preferably 85 parts by mass or less.

The conductive sheet may also contain a water-soluble conductive polymer. Water-soluble conductive polymers can hydrophilize the surfaces of the carbon nanotubes. This results in a favorable reduction in the pressure loss when an electrolyte passes through the electrode. The water-soluble conductive polymer is preferably a conductive polymer having sulfo groups. Specifically, a poly(isothianaphthene-sulfonic acid) can be used.

The amount added of the water-soluble conductive polymer is preferably not more than 5 parts by mass, more preferably not more than 4 parts by mass, and even more preferably 1 part by mass or less, per 100 parts by mass of the combined total of the carbon nanotubes and the carbon fibers contained in the conductive sheet. In those cases where the conductive sheet is obtained by filtering a dispersion containing the carbon nanotubes and the carbon fibers, the water-soluble organic polymer is usually not included in an amount exceeding 5 parts by mass.

The thickness of the conductive sheet in a dried state is preferably within a range from 0.01 to 1 mm, more preferably from 0.01 to 0.8 mm, and even more preferably from 0.02 to 0.5 mm. Provided the thickness is at least 0.01 mm, the conductivity is favorable, and provided the thickness is not more than 1 mm, favorable liquid permeability can be obtained.

Generally, a redox flow battery electrode tends to exhibit improved liquid permeability as the thickness is increased. However, in the case of the redox flow battery electrode according to one aspect of the present invention, because the conductive sheet and the porous sheet described below are laminated together, good liquid permeability can be achieved even without increasing the thickness of the conductive sheet. Further, in the redox flow battery electrode according to one aspect of the present invention, liquid flows in the thickness direction through the inside of the conductive sheet. Accordingly, the conductive sheet is preferably kept thin. A method for producing the conductive sheet is described below.

[Porous Sheet]

The porous sheet is formed from fibers having an average fiber diameter of greater than 1 μm. The porous sheet may also include small amounts of impurities and additives.

The average fiber diameter of the fibers contained in the porous sheet is preferably greater than 1 μm but not more than 200 μm, more preferably from 2 to 100 μm, and even more preferably from 5 to 30 μm. The porous sheet may have any of various configurations, including a woven fabric in which comparatively long fibers are woven together, a non-woven fabric (felt) in which fibers are intertwined without weaving, or a paper in which comparatively short fibers have been pulped and formed into a sheet-like form. In terms of the average fiber length, a fiber length that is typical for that particular configuration is preferably employed.

In those cases where fibers formed from a material having conductivity are used as the fibers having an average fiber diameter of greater than 1 μm, fibers formed from a metal or alloy having acid resistance and oxidation resistance, or carbon fibers are typically used. Examples of the fibers of a metal or alloy include fibers containing titanium, zirconium or platinum. Among the above possibilities, the use of carbon fibers is preferred.

In those cases where fibers formed from a material having no conductivity are used as the fibers having an average fiber diameter of greater than 1 μm, fibers formed from a polymer or glass having acid resistance are preferred. Examples of preferred polymer fibers include fibers formed from at least one polymer selected from among fluorine-based resins, fluorine-based elastomers, polyesters, acrylic resins, polyethylenes, polypropylenes, polyarylates, polyetheretherketones, polyimides and polyphenylene sulfides. From the viewpoint of acid resistance, fluorine-based resins, fluorine-based elastomers, polyesters, acrylic resins, polyethylenes, polypropylenes, polyetheretherketones, polyimides and polyphenylene sulfides are more preferred, and from the viewpoint of oxidation resistance, fluorine-based resins, fluorine-based elastomers, polyethylenes, polyetheretherketones and polyphenylene sulfides are particularly preferred. From the viewpoint of heat resistance, fluorine-based resins, fluorine-based elastomers, polyesters, polypropylenes, polyarylates, polyetheretherketones, polyimides and polyphenylene sulfides are preferred. Of the above, fibers formed from polyphenylene sulfides are particularly desirable. Woven fabrics, non-woven fabrics or sheet materials of these fibers can be processed to an appropriate size prior to use. Commercially available sheet materials may also be used.

The average fiber diameter of carbon fibers contained in the porous sheet is preferably greater than 1 μm but not more than 200 μm, more preferably from 2 to 100 μm, and even more preferably from 5 to 30 μm.

The volume resistivity of carbon fibers contained in the porous sheet is preferably not more than $1 \times 10^7$ Ω·cm, and is more preferably $10^3$ Ω·cm or lower. Provided the average fiber diameter satisfies this range, the pressure loss when an electrolyte passes through the electrode is favorably small. The volume resistivity of the carbon fibers can be measured using the method mentioned above.

The thickness of the porous sheet in a dried state is preferably within a range from 0.05 to 1 mm, more preferably from 0.07 to 0.5 mm, and even more preferably from 0.08 to 0.3 mm. Provided the thickness is at least 0.05 mm, the liquid permeability is favorable, and provided the thickness is not more than 1 mm, favorable conductivity can be obtained.

The redox flow battery electrode according to one aspect of the present invention is disposed between an ion exchange membrane and a bipolar plate in the redox flow battery.

A conventional cation exchange membrane can be used as the ion exchange membrane. Specific examples include perfluorocarbon polymers having sulfonic acid groups, hydrocarbon-based polymer compounds having sulfonic acid groups, polymer compounds doped with an inorganic acid such as phosphoric acid, organic/inorganic hybrid polymers that have been partially substituted with proton-conductive functional groups, and proton conductors obtained by impregnating a polymer matrix with a phosphoric acid solution or sulfuric acid solution. Of these, perfluorocarbon polymers having sulfonic acid groups are preferred, and Nafion™ is particularly desirable.

Conventional materials may be used for the bipolar plate, and for example, a conductive material containing carbon may be used. Specific examples include conductive plastics formed from graphite and an organochlorine compound or conductive plastics in which a portion of the graphite has been substituted with at least one of carbon black or diamond-like carbon, and molded materials obtained by kneading and molding carbon and a plastic. Of these, the use of a molded material obtained by kneading and molding carbon and a plastic is preferred.

[Structure of Redox Flow Battery and Electrode]

Figure 1:
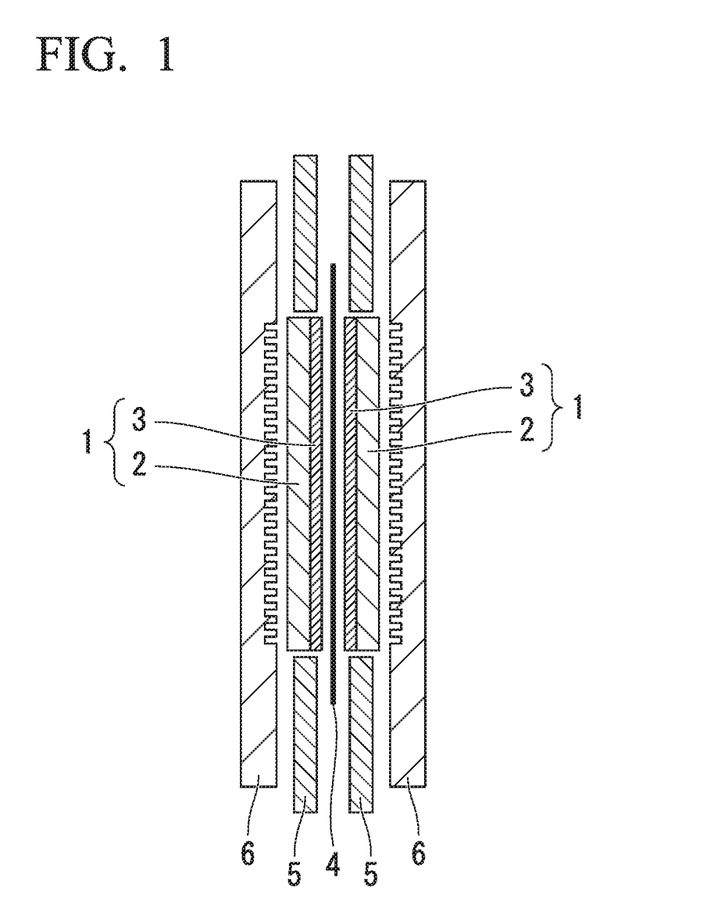
FIG. 1 is a diagram illustrating the basic structure of a redox flow battery provided with a redox flow battery electrode according to one aspect of the present invention, and is a cross-sectional view across a surface parallel to the thickness direction of the electrode.

One example of the redox flow battery according to one aspect of the present invention is illustrated in FIG. 1.

A redox flow battery electrode 1 according to one aspect of the present invention (hereafter sometimes referred to as simply "the electrode") is disposed between an ion exchange membrane 4 and a bipolar plate 6. The electrode 1 is formed from a porous sheet 3 laminated to a conductive sheet 2. It is preferable that a gasket 5 is positioned around the periphery of the electrode 1, so that the electrode 1 is sealed in the space between the ion exchange membrane 4 and the bipolar plate 6.

In the redox flow battery electrode according to one aspect of the present invention, the porous sheet may be located on the side facing the ion exchange membrane or the side facing the bipolar plate. Porous sheets may also be provided on both sides of the conductive sheet for the purpose of improving the liquid permeability. However, it is preferable that the structure of the electrode is designed to prevent any excessive increase in the electric resistance. When a porous sheet is on the side facing the bipolar plate, the porous sheet preferably has conductivity.

It is preferable that the ion exchange membrane, the porous sheet, the conductive sheet and the bipolar plate are laminated in that order.

In the bipolar plate 6, grooves such as channels or depressions are preferably formed on the surface facing the electrode in order to improve the liquid permeability. A bipolar plate 6 having comb-shaped grooves formed on the surface facing the electrode 1 can be used particularly favorably.

Figure 2:
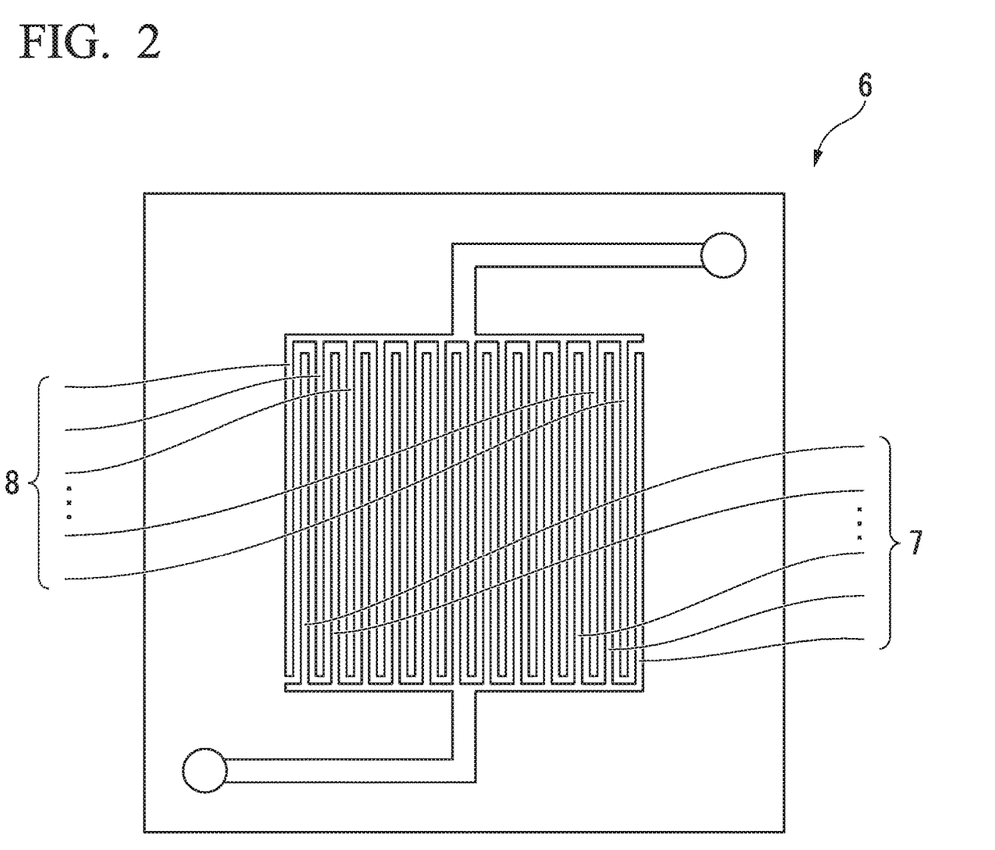
FIG. 2 is a plan view illustrating one example of a bipolar plate having comb-shaped grooves formed on the surface.

FIG. 2 is a plan view illustrating one example of the bipolar plate 6 having comb-shaped grooves formed on the surface. Grooves 7 on the electrolyte inlet side and grooves 8 on the electrolyte outlet side are formed from substantially the same comb-shaped grooves, and for example, the inlet-side and the adjacent outlet-side grooves may be formed on the bipolar plate surface in a 180-degree point symmetry relationship. The channels of the inlet-side and outlet-side grooves are positioned in an alternating parallel arrangement. The electrolyte supplied to the inlet-side grooves passes through the inside of the electrode from positions corresponding with the grooves, and flows into the neighboring outlet-side grooves. In an embodiment of the electrode in which the conductive sheet is disposed facing the bipolar plate and the porous sheet is disposed facing the ion exchange membrane, because there is not only an electrolyte flow that passes through only the conductive sheet, but also an electrolyte flow that also passes through the porous sheet, the pressure loss when the electrolyte passes through the electrode can be reduced.

A pair of electrodes that function as a positive electrode and a negative electrode are disposed on the two sides of the ion exchange membrane, and a bipolar plate is then provided on the outside of each electrode. When a single cell is constructed, a current collector with a current collection tab is provided on the outside of each of the two bipolar plates. Copper plates or gold-plated brass plates or the like can be used for the current collectors. When a single cell is constructed, a plastic frame is provided on the outside surfaces of the two current collectors and secured with fixing bolts.

[Production Method]

<Conductive Sheet>

The conductive sheet is produced by preparing a dispersion containing the carbon nanotubes, and then either removing the dispersion medium by filtration, or applying the dispersion using a coating, spin-casting or spraying method, and then removing the dispersion medium, thus molding the carbon nanotubes into a sheet-like form.

There are no particular limitations on the method used for preparing the dispersion containing the carbon nanotubes, and a ball mill, paint shaker, ultrasonic homogenizer or jet mill or the like may be used. In terms of enabling uniform dispersion of the carbon nanotubes without damaging the carbon nanotubes, a method using a wet jet mill is preferred. Preliminary mixing using a wet dispersion device or the like may be performed prior to the dispersion using the wet jet mill.

In those cases where the conductive sheet contains a plurality of types of carbon nanotubes having different average fiber diameters, the conductive sheet can be produced by adding the plurality of types of carbon nanotubes having different average fiber diameters to the dispersion medium, and then preparing the dispersion medium and performing molding in the same manner as described above.

A conductive sheet that also contains carbon fibers or a conductive polymer can be produced by mixing and dispersing the carbon fibers or the conductive polymer into the dispersion containing the carbon nanotubes, and then molding the resulting dispersion in the same manner as described above. When dispersing carbon fibers, an ultrasonic treatment is simple, and therefore preferred.

When preparing the dispersion containing the carbon nanotubes, adding a dispersant enables the carbon nanotubes to be mixed uniformly and more easily. Conventional materials may be used as the dispersant, and specific examples include water-soluble conductive polymers.

<Porous Sheet>

The porous sheet can be obtained, for example, by processing a commercially available sheet formed from fibers having an average fiber diameter of greater than 1 µm to obtain a sheet of the prescribed size.

<Lamination of Conductive Sheet and Porous Sheet>

The electrode can be formed by laminating together the independently produced conductive sheet and porous sheet. The lamination of the conductive sheet and the porous sheet may be performed, for example, by placing a filter paper on a filtration device, placing the porous sheet on top of the filter paper, and then pouring the dispersion containing the carbon nanotubes onto the porous sheet and performing suction filtration.

<Press Molding>

An electrode according to one aspect of the present invention may be formed as a sheet-like electrode by subjecting the laminate of the conductive sheet and the porous sheet obtained in the manner described above to press molding to form an integrated body. The press molding may be performed under heat.

The pressure applied and the heating temperature can be determined in advance by preliminary testing. For example, the electrode can be produced by applying a pressure of 20 MPa, and then heating at a temperature of 50 to 250° C. In those cases where the dispersion medium is water, heating at about 80° C. is preferably performed to ensure removal of the dispersion medium.

An additional porous sheet may be laminated to the conductive sheet of the laminate of the conductive sheet and the porous sheet obtained in the manner described above, and press molding may then be performed.

An electrode produced in this manner can be incorporated in a redox flow battery using normal methods. Operation of the battery may be conducted in accordance with typical redox flow battery operating methods.

EXAMPLES

The present invention is described below in more detail using a series of examples of the present invention. These examples are merely illustrations for further describing the invention, and the present invention is in no way limited by these examples.

Example 1

1. Preparation of Carbon Nanotubes Dispersion

A solution was prepared by dissolving 0.4 g of poly (isothianaphthenesulfonic acid) in 500 ml of pure water. To this solution were added 36 g of carbon nanotubes VGCF™-H (average fiber diameter: 150 nm, average fiber length: 15 µm) manufactured by Showa Denko K.K. as the first carbon nanotubes, and 4 g of carbon nanotubes VGCF™-X (average fiber diameter: 15 nm, average fiber length: 3 µm) manufactured by Showa Denko K.K. as the second carbon nanotubes, and the resulting mixture was premixed at 26,000 rpm for 30 minutes. A wet dispersion device (Magic LAB™ manufactured by IKA Works, Inc.) was used for the mixing. During this mixing process, 1 L of pure water was added to perform washing, and the mixture was collected to obtain a mixture containing the carbon nanotubes in 1.5 L of pure water. The mixing ratio between the first carbon nanotubes and the second carbon nanotubes provided 90 parts by mass and 10 parts by mass respectively per 100 parts by mass of the combined total of the first carbon nanotubes and the second carbon nanotubes. The mixing ratio of the water-soluble conductive polymer (the poly(isothianaphthenesulfonic acid)) provided 1 part by mass of the conductive polymer per 100 parts by mass of the combined total of the carbon nanotubes and the carbon fibers included in the conductive sheet.

The obtained mixture was processed using a wet jet mill (StarBurst HJP-25005, manufactured by Sugino Machine Co., Ltd.). The mixture was processed twice using a chamber nozzle diameter of 0.15 mm and an injection pressure of 150 MPa. During this process, 500 ml of pure water was added to perform washing, and the mixture was collected to obtain a dispersion containing the carbon nanotubes dispersed in 2 L of pure water.

2. Production of Conductive Sheet

A filter paper (5C (model number) manufactured by Advantec Toyo Kaisha, Ltd, Inc.) with a diameter of 9 cm was placed on a filtration device. Subsequently, 30 ml of the above dispersion containing the carbon nanotubes was measured and diluted with 250 ml of pure water, and the dilute dispersion was poured onto the filter paper. Following suction filtration, the residue was dried to obtain a conductive sheet. The thickness of the conductive sheet in a dried state was 0.3 mm.

3. Production of Porous Sheet

A non-woven fabric of polyphenylene sulfide (manufactured by Maeda Kosen Co., Ltd., weight: 60 g/m² grade, average fiber diameter: 25 µm) was processed to a diameter of 9 cm to form a porous sheet. The thickness of the porous sheet in a dried state was 0.1 mm.

4. Production of Electrode and Cell

The obtained conductive sheet and porous sheet were each cut to dimensions of 5 cm×5 cm, and one of each sheet were stacked to produce an electrode. One of these electrodes was used for each of the positive electrode and the negative electrode, and a redox flow cell was assembled by positioning the porous sheet sides of the electrodes on either side of an ion exchange membrane. Nafion™ 115 (model number) was used for the ion exchange membrane disposed between the electrodes.

A molded material produced by kneading and molding carbon and a plastic was used for the bipolar plates. Comb-shaped grooves were formed on the surfaces of the bipolar plates facing the electrodes. The groove width of the inlet-side grooves and the outlet-side grooves was 0.5 mm, the gaps between the two sets of grooves were 0.5 mm, and the groove depth was 1.0 mm for both sets of grooves.

A PTFE sheet with a thickness of 0.5 mm was used for the gasket. Conditions were set so that the thickness of the gasket was compressed to about 0.3 mm when the cell was assembled into a sealed state.

Gold-plated brass plates were mounted as current collectors to the outside surfaces of the two bipolar plates, thus completing construction of a unit cell.

5. Evaluation of Charge-Discharge Characteristics

The charge-discharge characteristics of the obtained redox flow cell were confirmed. For the electrolyte, an aqueous solution containing vanadium ions (IV-valent) and sulfuric acid was introduced at the positive electrode side, and an aqueous solution containing vanadium ions (III-valent) and sulfuric acid was introduced at the negative electrode side, and 25 ml of each electrolyte was circulated using a tube pump. The flow rate of the electrolyte was set to 64 ml/min. The current during charging and discharging was set to 2 A (80 mA/cm²), the charge-stop voltage was set to 1.75 V, and the discharge-stop voltage was set to 1.00 V.

The electric capacity was determined by measuring the discharge electric capacity during the fifth charge-discharge cycle.

The cell resistivity was measured by determining the charge average voltage and the discharge average voltage during the fifth charge-discharge cycle, and then calculating the cell resistivity on the basis of the following formula.

Cell resistivity[$\Omega \cdot cm^2$]=(charge average voltage[$V$]−discharge average voltage [$V$])×electrode surface area[$cm^2$]÷(2×charge current[$A$])

The cell resistivity of the redox flow cell assembled using the obtained electrodes was 0.99 $\Omega \cdot cm^2$.

The pressure loss was determined by assembling the redox flow cell, using a pressure gauge to measure the pressure at the liquid inlet and the pressure at the liquid outlet when the electrolyte was introduced at a flow rate of 20 ml/min, and then calculating the pressure loss as the difference between the two measured pressure values.

Table 1 to Table 5 show the various conditions, the electric capacity, the cell resistivity and the pressure loss, for both and the Examples 2 to 22 and Comparative Examples 1 to 4 described below.

Example 2

With the exception of not using the poly(isothianaphthenesulfonic acid), a redox flow battery electrode was obtained in the same manner as Example 1. A redox flow cell was then assembled using this electrode, and the electric capacity, the cell resistivity and the pressure loss were measured. Similar measurements were also conducted for the examples and comparative examples described below.

Example 3

With the exception of altering the amount of the poly (isothianaphthenesulfonic acid) to 1.6 g (equivalent to 4 parts by mass per 100 parts by mass of the combined total of the carbon nanotubes and the carbon fibers included in the conductive sheet), a redox flow battery electrode was obtained in the same manner as Example 1.

Examples 4 to 7

With the exception of altering the VGCF-H/VGCF-X mixing ratio as shown in Table 1, redox flow battery electrodes were obtained in the same manner as Example 1.

Comparative Example 1

A conductive sheet was produced in the same manner as Example 1, and this sheet was used as the electrode, without using a porous sheet.

Comparative Example 2

A conductive sheet was produced in the same manner as Example 4, and this sheet was used as the electrode, without using a porous sheet.

Comparative Example 3

With the exception of using a liquid prepared by adding 250 ml of pure water to 10 ml of the carbon nanotubes dispersion for the dispersion poured onto the filter paper in the filtration described above in "2. Production of Conductive Sheet", a conductive sheet was produced in the same manner as Comparative Example 1, and this sheet was used as the electrode, without using a porous sheet.

Example 8

In the "1. Preparation of Carbon Nanotubes Dispersion", when performing the premixing with the wet dispersion device, the amount of water added during washing and collection of the mixture was reduced to 200 ml. Further, in the "2. Production of Conductive Sheet", the porous sheet was placed on the filter paper, the dispersion containing the carbon nanotubes was poured onto the porous sheet, and suction filtration was performed, thereby producing an electrode having an integrated porous sheet and conductive sheet. With these exceptions, a redox flow battery electrode was obtained in the same manner as Example 1. The thickness of the conductive sheet in a dried state was 0.5 mm.

Example 9

With the exception of using a liquid prepared by adding 250 ml of pure water to 10 ml of the carbon nanotubes dispersion for the dispersion poured onto the porous sheet in the filtration described above in "2. Production of Conductive Sheet", a redox flow battery electrode was obtained in the same manner as Example 8. The thickness of the conductive sheet in a dried state was 0.1 mm. Accordingly, a PTFE sheet with a thickness of 0.25 mm was used for the gasket. Conditions were set so that the thickness of the gasket was compressed to about 0.15 mm when the cell was assembled into a sealed state. In any of the following examples in which the thickness of the conductive sheet was 0.1 mm or less, a similar gasket was used.

Example 10

With the exception of altering the amount of the carbon nanotubes dispersion from 10 ml to 2 ml, a redox flow battery electrode was obtained in the same manner as Example 9. The thickness of the conductive sheet in a dried state was equivalent to 0.02 mm.

Example 11

1. Preparation of Carbon Nanotubes Dispersion

With the exception of altering the amount of VGCF-H to 32.4 g and the amount of VGCF-X to 3.6 g, a carbon nanotubes dispersion was prepared in the same manner as Example 1.

2. Preparation of Dispersion Containing Carbon Nanotubes and Carbon Fibers

To 50 ml of the carbon nanotubes dispersion were added 4 g of carbon fibers (DONACARBO Chop™ S-232 manufactured by Osaka Gas Chemicals Co., Ltd. (fiber diameter: 13 μm, average fiber length: 5.5 mm)) and 200 ml of pure water, and the resulting mixture was stirred for 2 hours to obtain a dispersion containing carbon nanotubes and carbon fibers. A magnetic stirrer was used for stirring.

2. Production of Conductive Sheet

With the exception of replacing the carbon nanotubes dispersion with the dispersion containing carbon nanotubes and carbon fibers, a conductive sheet was obtained in the same manner as Example 1. The mixing ratio of carbon fibers provided 10 parts by mass of the carbon fibers per 100 parts by mass of the combined total of the carbon nanotubes and the carbon fibers contained in the conductive sheet.

3. Production of Porous Sheet

A porous sheet was obtained in the same manner as Example 1.

4. Production of Electrode and Cell

A redox flow battery electrode was obtained in the same manner as Example 1.

Example 12

With the exception of adding 4 g of carbon fibers (DONACARBO Milled™ SG-249 manufactured by Osaka Gas Chemicals Co., Ltd. (fiber diameter: 13 μm, average fiber length: 0.11 mm)) as the carbon fibers instead of the DONACARBO Chop S-232, a redox flow battery electrode was obtained in the same manner as Example 11.

Example 13

With the exception of altering the amount of VGCF-H to 18 g, the amount of VGCF-X to 2 g, and the amount of DONACARBO Milled SG-249 to 20 g, a redox flow battery electrode was obtained in the same manner as Example 12. The mixing ratio of carbon fibers provided 50 parts by mass of the carbon fibers per 100 parts by mass of the combined total of the carbon nanotubes and the carbon fibers contained in the conductive sheet.

Comparative Example 4

With the exception of altering the amount of VGCF-H to 0 g, the amount of VGCF-X to 0 g, and the amount of DONACARBO Milled SG-249 to 40 g, a redox flow battery electrode was obtained in the same manner as Example 12.

However, the conductivity was insufficient. And charging and discharging could not be performed.

Example 14

With the exception of using a liquid prepared by adding 250 ml of pure water to 10 ml of the dispersion containing carbon nanotubes and carbon fibers for the dispersion poured onto the filter paper in the filtration described above in "2. Production of Conductive Sheet", a redox flow battery electrode was obtained in the same manner as Example 12. The mixing ratio of carbon fibers provided 10 parts by mass of the carbon fibers per 100 parts by mass of the combined total of the carbon nanotubes and the carbon fibers contained in the conductive sheet.

Examples 15 to 17

With the exception of altering the mixing ratio of the DONACARBO Milled SG-249 as shown in Table 4, redox flow battery electrodes were obtained in the same manner as Example 14.

Example 18

With the exception of altering the amount of the dispersion containing carbon nanotubes and carbon fibers from 10 ml to 2 ml, a redox flow battery electrode was obtained in the same manner as Example 14.

Example 19

With the exception of using a commercially available carbon fiber paper (GDL10AA manufactured by SGL Carbon SE, average fiber diameter: 12 μm) as the porous sheet, a redox flow battery electrode was obtained in the same manner as Example 1.

Example 20

With the exceptions of altering the amount of VGCF-H to 18 g, the amount of VGCF-X to 2 g and the amount of DONACARBO Milled SG-249 to 20 g, and using a liquid prepared by adding 250 ml of pure water to 10 ml of the dispersion containing carbon nanotubes and carbon fibers for the dispersion poured onto the filter paper in the filtration described above in "2. Production of Conductive Sheet", a redox flow battery electrode was obtained in the same manner as Example 19.

Example 21

With the exception of using a commercially available carbon fiber felt (average fiber diameter: 10 μm) as the porous sheet, a redox flow battery electrode was obtained in the same manner as Example 1.

Example 22

With the exceptions of altering the amount of VGCF-H to 18 g, the amount of VGCF-X to 2 g and the amount of DONACARBO Milled SG-249 to 20 g, and using a liquid prepared by adding 250 ml of pure water to 10 ml of the dispersion containing carbon nanotubes and carbon fibers for the dispersion poured onto the filter paper in the filtration described above in "2. Production of Conductive Sheet", a redox flow battery electrode was obtained in the same manner as Example 19.

TABLE 1

|  |  | Material name | Units | Example 1 | Example 2 | Example 3 | Example 4 | Example 5 | Example 6 | Example 7 |
|---|---|---|---|---|---|---|---|---|---|---|
| Conductive sheet | First carbon nanotubes | VGCF-H (⌀150 nm) | Parts by mass/ CNT total | 90 | 90 | 90 | 100 | 95 | 80 | 70 |
|  | Second carbon nanotubes | VGCF-X (⌀15 nm) | Parts by mass/ CNT total | 10 | 10 | 10 | — | 5 | 20 | 30 |
|  | Carbon fibers | Long fibers (S-232, ⌀13 μm) | Parts by mass/ CNT + CF | — | — | — | — | — | — | — |
|  |  | Short fibers (SG-249, ⌀13 μm) | Parts by mass/ CNT + CF | — | — | — | — | — | — | — |
|  | Water-soluble conductive polymer | Poly- isothianaphthene- sulfonic acid | Parts by mass/ CNT + CF | 1 | 0 | 4 | 1 | 1 | 1 | 1 |
|  |  | Conductive sheet thickness | mm | 0.3 | 0.3 | 0.3 | 0.3 | 0.3 | 0.3 | 0.3 |
| Porous sheet |  | Material type |  | Polyphenylene sulfide (PS60, ⌀25 μm) | | | | | | |
| Gasket |  | PTFE sheet thickness | mm | 0.5 | 0.5 | 0.5 | 0.5 | 0.5 | 0.5 | 0.5 |
|  |  | Pressure loss (20 cc/min) | KPa | 174 | 191 | 169 | 156 | 166 | 198 | 241 |
|  |  | Cell resistivity | $\Omega \cdot cm^2$ | 0.99 | 10.2 | 1.09 | 1.17 | 1.05 | 0.95 | 0.99 |
|  |  | Electric capacity | mAh | 872 | 853 | 807 | 904 | 910 | 795 | 707 |

TABLE 2

|  |  | Material name | Units | Comparative Example 1 | Comparative Example 2 | Comparative Example 3 |
|---|---|---|---|---|---|---|
| Conductive sheet | First carbon nanotubes | VGCF-H (⌀150 nm) | Parts by mass/ CNT total | 90 | 100 | 90 |
|  | Second carbon nanotubes | VGCF-X (⌀15 nm) | Parts by mass/ CNT total | 10 | — | 10 |
|  | Carbon fibers | Long fibers (S-232, ⌀13 μm) | Parts by mass/ CNT + CF | — | — | — |
|  |  | Short fibers (SG-249, ⌀13 μm) | Parts by mass/ CNT + CF | — | — | — |
|  | Water-soluble conductive polymer | Poly- isothianaphthene- sulfonic acid | Parts by mass/ CNT + CF | 1 | 1 | 1 |
|  |  | Conductive sheet thickness | mm | 0.3 | 0.3 | 0.1 |
| Porous sheet |  | Material type |  | — | | |
| Gasket |  | PTFE sheet thickness | mm | 0.5 | 0.5 | 0.5 |
|  |  | Pressure loss (20 cc/min) | KPa | 281 | 259 | 87 |
|  |  | Cell resistivity | $\Omega \cdot cm^2$ | 1.29 | 1.45 | 1.12 |
|  |  | Electric capacity | mAh | 638 | 661 | 621 |

TABLE 3

| | Material name | Units | Example 8 | Example 9 | Example 10 | Example 11 | Example 12 | Example 13 | Comparative Example 4 |
|---|---|---|---|---|---|---|---|---|---|
| Conductive sheet | First carbon nanotubes | VGCF-H (⌀150 nm) | Parts by mass/ CNT total | 90 | 90 | 90 | 90 | 90 | 90 | — |
| | Second carbon nanotubes | VGCF-X (⌀15 nm) | Parts by mass/ CNT total | 10 | 10 | 10 | 10 | 10 | 10 | — |
| | Carbon fibers | Long fibers (S-232, ⌀13 μm) | Parts by mass/ CNT + CF | — | — | — | 10 | — | — | — |
| | | Short fibers (SG-249, ⌀13 μm) | Parts by mass/ CNT + CF | — | — | — | — | 10 | 50 | 100 |
| | Water-soluble conductive polymer | Poly-isothianaphthene-sulfonic acid | Parts by mass/ CNT + CF | 1 | 1 | 1 | 1 | 1 | 1 | 1 |
| | Conductive sheet thickness | | mm | 0.5 | 0.1 | 0.02 | 0.3 | 0.3 | 0.3 | 0.3 |
| Porous sheet | Material type | | | Polyphenylene sulfide (PS60, ⌀25 μm) | | | | | | PS60 |
| Gasket | PTFE sheet thickness | | mm | 0.5 | 0.25 | 0.25 | 0.5 | 0.5 | 0.5 | 0.5 |
| | Pressure loss (20 cc/min) | | KPa | 225 | 56 | 9.9 | 160 | 132 | 110 | 3.8 |
| | Cell resistivity | | Ω·cm² | 0.95 | 0.95 | 1.24 | 1.10 | 1.02 | 1.09 | Insufficient conductivity charge/ discharge impossible |
| | Electric capacity | | mAh | 750 | 871 | 965 | 855 | 891 | 923 | |

TABLE 4

| | Material name | Units | Example 14 | Example 15 | Example 16 | Example 17 | Example 18 |
|---|---|---|---|---|---|---|---|
| Conductive sheet | First carbon nanotubes | VGCF-H (⌀150 nm) | Parts by mass/ CNT total | 90 | 90 | 90 | 90 | 90 |
| | Second carbon nanotubes | VGCF-X (⌀15 nm) | Parts by mass/ CNT total | 10 | 10 | 10 | 10 | 10 |
| | Carbon fibers | Long fibers (S-232, ⌀13 μm) | Parts by mass/ CNT + CF | — | — | — | — | — |
| | | Short fibers (SG-249, ⌀13 μm) | Parts by mass/ CNT + CF | 10 | 50 | 80 | 95 | 50 |
| | Water-soluble conductive polymer | Poly-isothianaphthene-sulfonic acid | Parts by mass/ CNT + CF | 1 | 1 | 1 | 1 | 1 |
| | Conductive sheet thickness | | mm | 0.1 | 0.1 | 0.1 | 0.1 | 0.02 |
| Porous sheet | Material type | | | Polyphenylene sulfide (PS60, ⌀25 μm) | | | | |
| Gasket | PTFE sheet thickness | | mm | 0.25 | 0.25 | 0.25 | 0.25 | 0.25 |
| | Pressure loss (20 cc/min) | | KPa | 24 | 11 | 8.4 | 4.3 | 5.4 |
| | Cell resistivity | | Ω·cm² | 0.98 | 1.05 | 1.19 | 1.71 | 1.39 |
| | Electric capacity | | mAh | 892 | 937 | 930 | 697 | 1008 |

TABLE 5

|  |  | Material name | Units | Example 19 | Example 20 | Example 21 | Example 22 |
|---|---|---|---|---|---|---|---|
| Conductive sheet | First carbon nanotubes | VGCF-H (⌀150 nm) | Parts by mass/ CNT total | 90 | 90 | 90 | 90 |
|  | Second carbon nanotubes | VGCF-X (⌀15 nm) | Parts by mass/ CNT total | 10 | 10 | 10 | 10 |
|  | Carbon fibers | Long fibers (S-232, ⌀13 μm) | Parts by mass/ CNT + CF | — | — | — | — |
|  |  | Short fibers (SG-249, ⌀13 μm) | Parts by mass/ CNT + CF | — | 50 | — | 50 |
|  | Water-soluble conductive polymer | Poly-isothianaphthene-sulfonic acid | Parts by mass/ CNT + CF | 1 | 1 | 1 | 1 |
|  |  | Conductive sheet thickness | mm | 0.3 | 0.1 | 0.3 | 0.1 |
| Porous sheet |  | Material type |  | CF paper (⌀13 μm) | | CF felt (⌀10 μm) | |
| Gasket |  | PTFE sheet thickness | mm | 0.5 | 0.5 | 0.5 | 0.5 |
|  |  | Pressure loss (20 cc/min) | KPa | 210 | 21 | 187 | 15 |
|  |  | Cell resistivity | Ω·cm² | 0.85 | 0.89 | 0.88 | 0.9 |
|  |  | Electric capacity | mAh | 792 | 893 | 832 | 921 |

By comparing Examples 1 to 7 and Comparative Examples 1 to 3, it was evident that by using an electrode having a structure in which a conductive sheet containing carbon nanotubes had been laminated to a porous sheet, the electric capacity, the cell resistivity and the pressure loss could all be improved.

In Examples 1 to 7, the mixing ratio between the first carbon nanotubes and the second carbon nanotubes was altered. It was evident that each of these examples had superior characteristics to any of Comparative Examples 1 to 3. In Example 5, in which the number of parts by mass of the second carbon nanotubes was 5 parts by mass per 100 parts by mass of the combined total of the first carbon nanotubes and the second carbon nanotubes, the electric capacity was the highest. In Example 4, which contained no second carbon nanotubes, although the cell resistivity was comparatively high, the electric capacity and the pressure loss were excellent.

In Example 3, which contained 4 times the amount of the water-soluble conductive polymer compared with the other examples, the electric capacity, the cell resistivity and the pressure loss characteristics exhibited excellent balance.

In Examples 8 to 10, redox flow battery electrodes having different thickness values for the conductive sheet were produced. The electrodes having a thinner conductive sheet tended to exhibit superior electric capacity and pressure loss characteristics.

By comparing Examples 11 to 13 and Comparative Example 4, it was evident that when the conductive sheet contained carbon nanotubes having an average fiber diameter of 1 μm or less, the electric capacity, the cell resistivity and the pressure loss characteristics all improved.

In Example 13, in which the number of parts by mass of carbon fibers contained in the conductive sheet was 50 parts by mass per 100 parts by mass of the combined total of the first carbon nanotubes and the second carbon nanotubes, the electric capacity and the pressure loss characteristics tended to be superior to those of Example 12 which contained only 10 parts by mass of the carbon fibers.

In Examples 14 to 18, redox flow cells having different mixing ratios for the carbon fibers contained in the conductive sheet and different thickness values for the conductive sheet were produced. When the amount of carbon fibers in the conductive sheet was small, the cell resistivity tended to be superior, whereas when the amount of carbon fibers was large, the pressure loss tended to be superior. Further, a thinner conductive sheet tended to exhibit superior electric capacity.

Further, even in Examples 9, 10 and 14 to 18, where the thickness of the conductive sheet was less than 0.3 mm, the electrode was able to be produced with no problems by using a structure including the laminated porous sheet. In comparison, in Comparative Example 3, the strength was unsatisfactory, and an electrode was unable to be produced, suggesting that the electrodes of the examples are also superior from a strength perspective.

Examples 19 to 22 are examples in which the porous sheet has conductivity, and it was evident that this was effective in reducing the cell resistivity. Further, adding carbon fibers to the conductive sheet tended to yield superior electric capacity and pressure loss characteristics.

In Examples 1, 5, 6 and 7, the structures of the first carbon nanotubes and the second carbon nanotubes were confirmed. A transmission electron microscope was used to confirm the structures. The results are shown in Table 6.

TABLE 6

|  |  |  | Example 1 | Example 5 | Example 6 | Example 7 |
|---|---|---|---|---|---|---|
| First carbon nanotubes | VGCF-H (⌀150 nm) | Parts by mass/ CNT total | 90 | 95 | 80 | 70 |
| Second carbon nanotubes | VGCF-X (⌀15 nm) | Parts by mass/ CNT total | 10 | 5 | 20 | 30 |
| Proportion of straddled structures in transmission electron microscope image | | | 50 | 70 | 20 | 10 |
| Pressure loss (20 cc/min) | | KPa | 174 | 166 | 198 | 241 |
| Cell resistivity | | Ω·cm² | 0.99 | 1.05 | 0.95 | 0.99 |
| Electric capacity | | mAh | 872 | 910 | 795 | 707 |

Based on Table 6 it was evident that larger values for the proportion of straddled structures tended to yield superior pressure loss and electric capacity characteristics. Further, it was also found that a smaller proportion of the second carbon nanotubes facilitated the formation of straddled structures.

DESCRIPTION OF THE REFERENCE SIGNS

1: Electrode
2: Conductive sheet
3: Porous sheet
4: Ion exchange membrane
5: Gasket
6: Bipolar plate
7: Inlet-side groove
8: Outlet-side groove

The invention claimed is:

1. A redox flow battery electrode having:
a conductive sheet comprising carbon nanotubes with an average fiber diameter of 1 μm or less, and
a porous sheet that is laminated to the conductive sheet and is formed from fibers with an average fiber diameter of greater than 1 μm, wherein
at least one of the following conditions (i) or (ii) is satisfied:
(i) the carbon nanotubes comprise first carbon nanotubes having an average fiber diameter of 100 to 1,000 nm, and second carbon nanotubes having an average fiber diameter of 30 nm or less, and a weight ratio of the first carbon nanotubes to the second carbon nanotubes is 70:30 to 90:10; or
(ii) the fibers of the porous sheet are polyphenylene sulfide fibers having an average fiber diameter of greater than 1 μm.

2. The redox flow battery electrode according to claim 1, wherein the condition (i) is satisfied.

3. The redox flow battery electrode according to claim 2, wherein at least a portion of the second carbon nanotubes straddle two or more of the first carbon nanotubes.

4. The redox flow battery electrode according to claim 1, wherein the porous sheet is formed from carbon fibers having an average fiber diameter of greater than 1 μm.

5. The redox flow battery electrode according to claim 1, wherein the condition (ii) is satisfied.

6. The redox flow battery electrode according to claim 1, wherein
a thickness of the conductive sheet is 0.01 to 1 mm, and a thickness of the porous sheet is 0.05 to 1 mm.

7. The redox flow battery electrode according to claim 1, wherein
a thickness of the conductive sheet is 0.02 to 0.5 mm, and a thickness of the porous sheet is 0.08 to 0.3 mm.

8. The redox flow battery electrode according to claim 1, wherein
the conditions (i) and (ii) are satisfied.

9. A redox flow battery comprising the redox flow battery electrode according to claim 1 disposed between an ion exchange membrane and a bipolar plate.

10. The redox flow battery according to claim 9, wherein comb-shaped grooves are formed on a surface of the bipolar plate facing the electrode.

* * * * *